United States Patent [19]

Weber

[11] Patent Number: 4,999,113

[45] Date of Patent: Mar. 12, 1991

[54] SELECTIVE SEPARATION OF THIOCYANATE IONS FROM A SCRUBBING MEDIUM

[75] Inventor: Günter Weber, Altenmarkt, Fed. Rep. of Germany

[73] Assignee: Linde Aktiengesellschaft, Wiesbaden, Fed. Rep. of Germany

[21] Appl. No.: 437,709

[22] Filed: Nov. 17, 1989

Related U.S. Application Data

[63] Continuation-in-part of Ser. No. 371,135, Jun. 26, 1989, abandoned.

[30] Foreign Application Priority Data

Jun. 24, 1988 [DE] Fed. Rep. of Germany ....... 3821350

[51] Int. Cl.$^5$ ............................................. B01J 41/04
[52] U.S. Cl. .................................. 210/664; 210/669; 210/670; 210/683
[58] Field of Search ................ 210/664, 669, 670, 683

[56] References Cited

U.S. PATENT DOCUMENTS 4,708,804 11/1987 Coltrinari ........................... 210/684

FOREIGN PATENT DOCUMENTS 2364267 12/1973 Fed. Rep. of Germany .

OTHER PUBLICATIONS

CA 74088h, vol. 80 (1974).
CA 144484b, vol. 82 (1975).

Primary Examiner—Ivars Cintins
Attorney, Agent, or Firm—Millen, White & Zelano

[57] ABSTRACT

A process is provided for the selective removal of thiocyanate ions from a vanadium-containing loaded scrubbing solution used for oxidative hydrogen sulfide scrubbing. The thiocyanate ions are removed by means of an ion exchanger making reuse of the scrubbing solution possible. In this process, the ion exchanger can be loaded until the inlet and outlet concentrations of the thiocyanate ions are substantially the same.

21 Claims, No Drawings

SELECTIVE SEPARATION OF THIOCYANATE IONS FROM A SCRUBBING MEDIUM

CROSS-REFERENCE TO RELATED APPLICATION

This application is a continuation-in-part of Application Ser. No. 07/371,135, filed June 26, 1989, now abandoned.

FIELD OF THE INVENTION

The invention relates in general to a process for scrubbing gases containing hydrogen sulfide and/or hydrogen cyanide and, more particularly, to a process for the selective separation of thiocyanate ions from a vanadium-containing scrubbing solution which is used in the oxidative scrubbing of gases to remove hydrogen sulfide.

BACKGROUND OF THE INVENTION

One of the major disadvantages of prior art methods used for the oxidative removal of hydrogen sulfide from gases is the occurrence of secondary reactions which result in the formation of other undesired materials. The scrubbing medium utilized for hydrogen sulfide removal can be comprised, for example, of mixtures of $Na_2CO_3/NaHCO_3$, V, and organic promoters in an aqueous solution. In addition to $H_2S$ and $CO_2$, a number of gases, especially gases obtained from the treatment of coal, contain hydrocyanic acid as a third important sour gas component. Coke oven gas, for example, can contain 4–13 moles/100 $m^3$ of HCN. During the hydrogen sulfide scrubbing step with a solution containing alkali salts, up to 95 percent of HCN is removed from the gas and converted to thiocyanate, according to the following reaction:

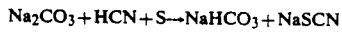

$Na_2CO_3 + HCN + S \rightarrow NaHCO_3 + NaSCN$

The thiocyanate cannot be selectively separated by simple crystallization from the enriched scrubbing medium due to the high solubility of the thiocyanate.

In the treatment of gases having high HCN concentrations, HCN is often removed in a preliminary scrubbing operation in order to prevent accumulation of undesirably high concentrations of solid matter in the scrubbing medium. Such a process, which is described in the McMaster Symposium on Iron Steelmaking Production No. 5; Treatment of Coke Oven Gas, McMaster University, Hamilton, Ontario, May 26–27, 1977; published by McMaster University, Hamilton, Ontario, 1977, pages 3.1–3.19, uses a preliminary scrubbing step with ammonia. This preliminary scrubbing, which is performed prior to the hydrogen sulfide scrubbing operation, produces ammonium thiocyanate, according to the reaction:

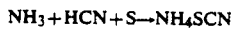

$NH_3 + HCN + S \rightarrow NH_4SCN$

However, thus far, it has not been possible to achieve an adequate preliminary separation of HCN for the downstream treatment of the gas with the oxidative scrubbing solution.

In view of the rapid accumulation of the thiocyanate solids in the oxidative hydrogen sulfide scrubbing solution, it is still necessary to withdrawn the loaded scrubbing solution and exchange same, at least in part, before the quantity of dissolved solids increases to such a degree that precipitates are formed. It is known from the above-mentioned article to remove sodium thiocyanate by solvent extraction from the hydrogen sulfide scrubbing medium. However, this method has been abandoned due to high operating costs. Consequently, heretofore, the only economically feasible methods for cleaning the scrubbing medium loaded with thiocyanate have been reductive combustion and wet oxidation processes. However, both of these known processes have the disadvantage of producing additional compounds which must be removed or are otherwise undesirable. For example, the reductive combustion process produces sodium carbonate, and the wet oxidation process forms ammonium sulfate. It is thus desirable to have an economical process which selectively removes the thiocyanate ions from a scrubbing solution used for oxidative hydrogen sulfide removal, without the attendant production of other undesired byproducts.

SUMMARY OF THE INVENTION

It is, therefore, a principal object of an aspect of this invention to provide a process to selectively separate thiocyanate ions from a loaded oxidative hydrogen sulfide scrubbing solution which contains vanadium and compounds thereof.

An object of another aspect of the invention is to provide a process which selectively removes thiocyanate ions from a vanadium-containing scrubbing solution, without any substantial removal of the vanadium or compounds thereof.

Upon further study of the specification and appended claims, further objects and advantages of this invention will become apparent to those skilled in the art.

To attain the first mentioned object, a process is provided for the selective separation of thiocyanate ions from a loaded scrubbing medium containing vanadium ions which is used for the oxidative removal of hydrogen sulfide from gases, comprising passing the loaded scrubbing liquid through a regenerable medium-alkaline anion exchanger to remove the thiocyanate ions.

In another aspect, the present invention provides an improved process for the removal of thiocyanate ions from a loaded vanadium-containing scrubbing solution for the oxidative removal of hydrogen sulfide from gases, wherein the scrubbing solution is passed through a bed of anion exchange resins until the concentration of the thiocyanate ions in the effluent from the resin bed is substantially the same as in the scrubbing solution resulting in substantially little or no removal of the vanadium or vanadium-containing compounds from the scrubbing solution.

In an especially preferred embodiment of the present process, the pH of the scrubbing solution is adjusted to above 9, and the anion exchange process is carried out as described above. In this way, a vanadium-free thiocyanate solution is obtained during regeneration of the ion exchanger. At a lower pH of between 8 and 9, the process of the invention is still very good insofar as the molar ratio of thiocyanate to vanadium in the solution obtained during regeneration of the ion exchanger is higher than 10:1, and preferably higher than 100:1.

DETAILED DESCRIPTION OF THE INVENTION

According to the present invention, isocyanate ions are selectively removed from a vanadium-containing scrubbing solution by means of a regenerable ion exchange resin.

Ion exchangers make use of organic solids having a three-dimensional, water-insoluble high molecular weight skeleton into which are incorporated numerous ion-forming "anchor groups". Loosely bound counterions of the anchor groups can be exchanged for other ions of the same charge which are dissolved and/or present in the surrounding liquid.

The ion exchange resins useful for the invention are conventional, for example, Lewatit® of Bayer A.G. See the general literature for a description of other anion exchange resins.

In a preferred embodiment, an intermediate-alkaline ion exchanger is utilized having, for example, a polystyrene matrix having tertiary amine anchor groups such as $NH_4^+$ and $OH$ counterions.

The ion exchange resins for use according to the present invention are preferably contained in a bed within a column. Although the column can be arranged in any direction, it is preferred to use a vertical column to facilitate gravity flow through the bed.

Since cooling of the scrubbing solution may result in the formation of a precipitate, it is preferred to carry out the ion exchange process of the present invention at a temperature of from about 0°–80° C., more preferably from about 20°–50° C.

When a scrubbing medium loaded with thiocyanate and vanadium ions flows through the bed of ion exchange resins, the counterions are separated by dissociation, since the skeleton, together with the anchor groups, are positively charged. Therefore, the ion exchanger utilized in the process of the present invention is an anion exchanger. During the ion exchange process, the thiocyanate ions displace the original counterions so that it is possible to remove, at the lower end of an ion exchange column, a thiocyanate-free scrubbing solution loaded with counterions. The scrubbing medium need not be discarded, but instead can be reused for scrubbing hydrogen sulfide from gases. Operation according to the present process represents a considerable reduction in the operating costs.

In accordance with a preferred embodiment of the process of the present invention, the scrubbing solution is passed through the bed of an ion exchange resin until the ion exchanger is completely loaded with the thiocyanate ions resulting in breakthrough and thereafter the desired point is reached when the inlet and outlet concentrations of the thiocyanate ions in the scrubbing medium are the same or substantially the same, i.e., when the outlet concentration is approximately 80–100% of the inlet concentration. In this operation, the ion exchanger is loaded exhaustively (with thiocyanate ions), rather than, as is customary, only up to the breakthrough of the ions to be separated, i.e., when ions of the material to be absorbed are present in substantial quantities in the effluent from the ion exchanger. By following this procedure according to the present invention, all anions of acids that are weaker than NaSCN, for example, $VO_3$, which are initially similarly absorbed, are displaced by NaSCN during the ion exchange process.

Since ion exchange is a reversible process, after having been exhaustively loaded, the ion exchanger is eluted with a solution containing the counterions for purposes of regeneration. In the regeneration process, the ion exchanger is restored to the exchange-capable, counterion-binding form. According to a preferred aspect of this invention, an eluate can be obtained from the ion exchanger, which contains largely thiocyanate and hydroxide ions and is, for the most part, substantially free of vanadium when regenerating the ion exchanger.

When removal of the thiocyanate ions is carried out according to the present invention at relatively low pH values of the scrubbing medium of 8–9, an enrichment of thiocyanate with respect to vanadium in a molar ratio of higher than 10:1, preferably higher than 100:1, is achieved during regeneration of the ion exchanger.

In a preferred aspect of the invention, the pH of the scrubbing media is adjusted to a value above 9, e.g., in the pH range of 9 to 12, in a step prior to ion exchange by stripping the scrubbing liquid with, for example, air or $N_2$ for removal of $CO_2$ in accordance with the reaction:

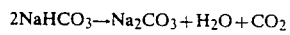

$$2NaHCO_3 \rightarrow Na_2CO_3 + H_2O + CO_2$$

or addition of NaOH.

When the ion exchange process of the present invention is carried out using a scrubbing media having a pH above 9, it has been found that the thiocyanate-containing eluate is substantially free of vanadium and compounds thereof. For this reason, the thiocyanate-containing, vanadium-free eluate can be introduced, for waste removal, into a waste water treatment plant.

Without being bound by an explanation of the mechanism of the role of pH, it is believed that at a higher pH, a weakly bound V (as $VO_3$) is possibly eluated by the OH ions during the loading procedure. The active sites previously occupied by $VO_3$ are made ready for interaction with thiocyanate ions as desired.

The process of this invention can be utilized in treating all oxidative scrubbing solutions for scrubbing of hydrogen sulfide, such as, for example, mixtures of carbonates and vanadium salts with addition of anthraquinone disulfonic acid, organic nitrogen compounds, or aromatic sulfonates.

For the commercial implementation of the process of the present invention, it is contemplated that interchangeable, reversible coupled pairs of ion exchange columns will be used in a conventional manner.

Without further elaboration, it is believed that, using the preceding description, one skilled in the art can utilize the present invention to its fullest extent. The following preferred specific embodiments are, therefore, to be construed as merely illustrative and not limiting of the remainder of the disclosure whatsoever.

In the foregoing and in the following examples, all temperatures are set forth uncorrected in degrees Celsius; and, unless otherwise indicated, all parts and percentages are by weight.

The entire texts of all applications, patents, and publications cited above and below, and of corresponding West German Application No. P 38 21 350.8, filed June 24, 1988, are hereby incorporated by reference.

EXAMPLE 1

45 $m^3/H$ of a scrubbing medium loaded with 80 g/l of NaSCN and a mixture of 50 g/l of $Na_2SO_4$, 40 g/l of $Na_2CO_3$, and 2 g/l of $NaVO_3$ having a pH of 10 was introduced into the upper end of a vertical ion exchanger. The ion exchanger contained a bed of a matrix of polystyrene ion exchange resin having tertiary amine anchor groups and loosely bound OH counterions. The loaded scrubbing solution at a temperature of about 40° C. is passed through the ion exchange column until the NaSCN outlet concentration equals the inlet concentration into the ion exchanger.

The exhaustively loaded ion exchanger is regenerated by passing through the bed 12 m³/hr of H₂O for 1 hour and, subsequently, 12 m³/hr of 4% NaOH solution for a period of 1 hour. In this regeneration process, a solution is withdrawn at the bottom of the column having an SCN concentration of 45 kg/m³ and a VO₃ concentration of 0 kg/m³.

The preceding example can be repeated with similar success by substituting the generic or specific reaction and/or operation conditions of this invention for those used in the preceding examples.

From the foregoing description, one skilled in the art can easily ascertain the essential characteristics of this invention and, without departing from the spirit and scope thereof, can make various changes and modifications of the invention to adapt it various usages and conditions.

What is claimed is:

1. A process for the selective separation of thiocyanate ions from a loaded scrubbing medium in the oxidative scrubbing of gases to remove hydrogen sulfide, which medium contains said ions and vanadium oxide anions, comprising separating the thiocyanate ions from the scrubbing medium by passing the scrubbing medium through a regenerable intermediate alkaline anion exchanger to load the ion exchanger with thiocyanate ions and continuing the passing of the scrubbing medium through the ion exchanger until the inlet and outlet concentrations of the thiocyanate ions in the scrubbing medium are the same or substantially the same.

2. A process according to claim 1, wherein the scrubbing medium has a pH of 8 to 9, and regenerating the ion exchanger to obtain a solution having a molar ratio of thiocyanate to vanadium higher than 10:1.

3. A process according to claim 1, wherein the scrubbing medium has a pH above 9, and regenerating the ion exchanger to obtain a vanadium-free thiocyanate solution.

4. A process according to claim 1, wherein the scrubbing medium has a pH of 8 to 9, and regenerating the ion exchanger to obtain a solution having a molar ratio of thiocyanate to vanadium higher than 100:1.

5. A process for the selective removal of thiocyanate ions from an aqueous vanadium-containing and thiocyanate-containing scrubbing solution, comprising passing the solution through an anion exchange column to load the column with thiocyanate ions and continuing passing until the concentration of the thiocyanate ions in the effluent is substantially the same in the effluent as in the scrubbing solution.

6. The process of claim 5, wherein the pH of the solution is between 8 and 9.

7. The process of claim 5, wherein the pH of the solution is above 9.

8. The process of claim 7, wherein vanadium and compounds thereof are adsorbed on the ion exchange resin in the column, and the solution is passed through the column until substantially all of the vanadium and compounds thereof which have been adsorbed onto the ion exchange resin are displaced by thiocyanate ions.

9. The process of claim 5, wherein the solution further comprises $Na_2CO_3$, $NaHCO_3$, and organic promoters.

10. The process of claim 5, wherein the anion exchange resin has a polystyrene resin matrix with $NH_3$ anchor groups and OH counterions.

11. The process of claim 5, wherein the temperature of the scrubbing solution is from about 0°–80° C.

12. A process for the selective removal of thiocyanate ions from a loaded vanadium-containing scrubbing solution used in oxidative scrubbing of gases to remove hydrogen sulfide which comprises: adjusting the pH of the scrubbing solution above 9 and then passing the scrubbing solution through a bed of an anion exchange resin, until the concentration of thiocyanate ions in the effluent is substantially the same as the scrubbing solution, and any vanadium oxide anions thereof which may have been initially adsorbed on the anion exchange resin are substantially replaced by thiocyanate ions.

13. The process of claim 12, wherein the scrubbing solution is at a temperature of from 0°–80° C.

14. The process of claim 12, wherein the anion exchange resin is a polystyrene matrix having $NH_4^+$ groups and OH counterions.

15. The process of claim 12, wherein the scrubbing solution is stripped with air to remove $CO_2$ and to adjust the pH above 8.

16. The process of claim 12, wherein the scrubbing solution prior to the ion exchange is stripped with $N_2$ to remove $CO_2$ and adjust the pH above 8.

17. The process of claim 12, wherein NaOH is added prior to the ion exchange to the scrubbing solution to adjust the pH above 8.

18. A process according to claim 12, further comprising terminating the passing of said scrubbing solution, and thereafter passing an eluant through the bed of anion exchange material to recover an eluate free of vanadium.

19. A process for the selective removal of thiocyanate ions from an aqueous vanadium-containing and thiocyanate-containing solution, comprising passing the solution through a column containing an anion exchange resin which initially coadsorbs thiocyanate ions and vanadium oxide anions, and continuing passing said solution through the column until substantially all of the coadsorbed vanadium oxide anions are selectively replaced by thiocyanate ions.

20. A process according to claim 19, wherein said solution is a scrubbing solution used for oxidative sulfide removal.

21. A process according to claim 20, further comprising terminating the passing of said scrubbing solution, and thereafter passing an eluant through the bed of anion exchange material to recover an eluate free of vanadium.

* * * * *